C. H. BARNES, J. O. SIMPSON, W. H. STEERE & W. F. LAWRENCE.
GUN SIGHT.
APPLICATION FILED JAN. 20, 1913.
1,161,281.
Patented Nov. 23, 1915.
2 SHEETS—SHEET 1.
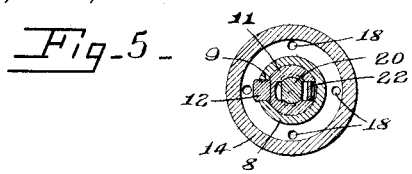
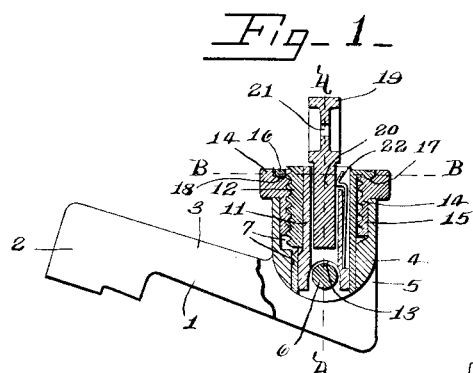
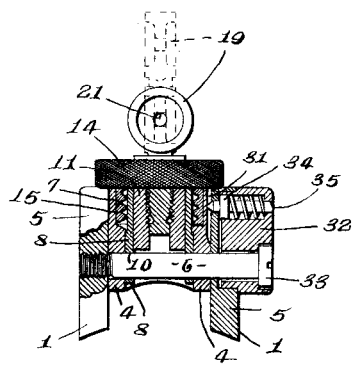
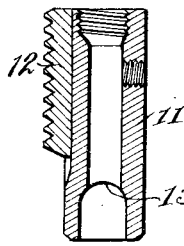
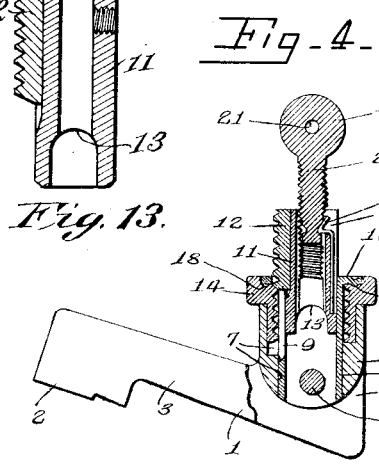
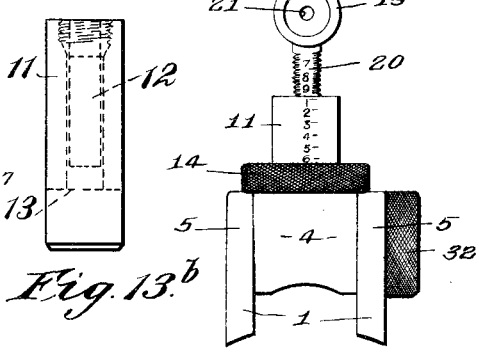
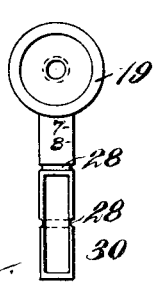
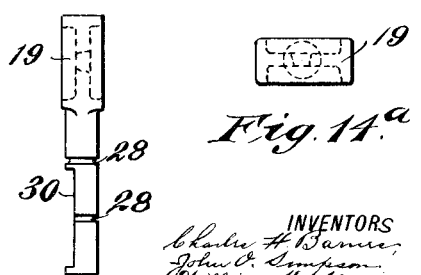
WITNESSES:
Chas H. Young.
J. B. Pickard.
INVENTORS
Charles H. Barnes,
John O. Simpson,
William H. Steere,
William F. Lawrence.
BY
Parson Hall Boduell
ATTORNEYS C. H. BARNES, J. O. SIMPSON, W. H. STEERE & W. F. LAWRENCE.
GUN SIGHT.
APPLICATION FILED JAN. 20, 1913.
1,161,281.
Patented Nov. 23, 1915.
2 SHEETS—SHEET 2.
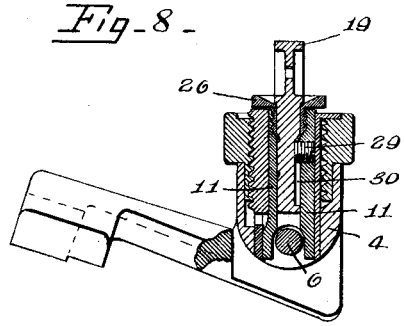
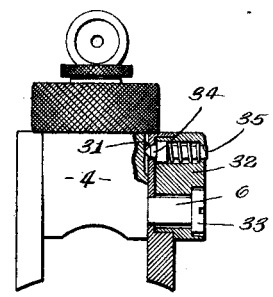
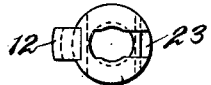
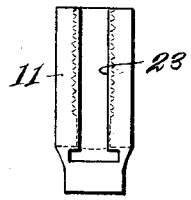
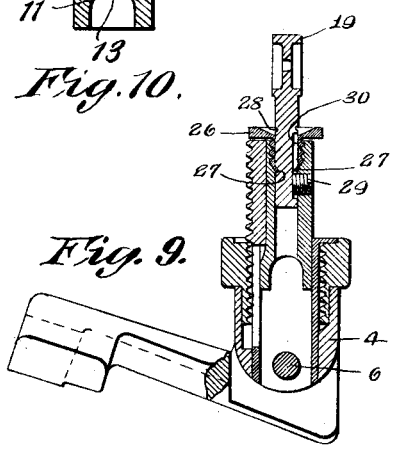
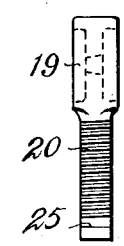
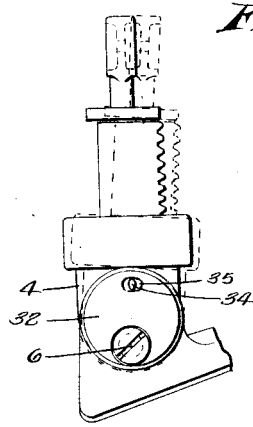
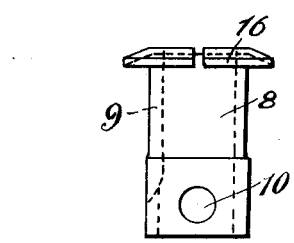
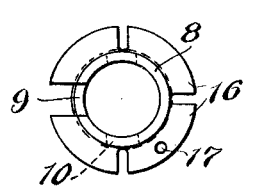
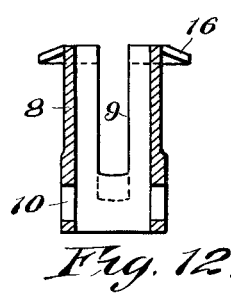
WITNESSES:
INVENTORS
Charles H. Barnes,
John O. Simpson,
William H. Steere,
William F. Lawrence,
BY
ATTORNEYS

UNITED STATES PATENT OFFICE.

CHARLES H. BARNES, JOHN O. SIMPSON, AND WILLIAM H. STEERE, OF ILION, AND WILLIAM F. LAWRENCE, OF UTICA, NEW YORK, ASSIGNORS TO REMINGTON ARMS & AMMUNITION COMPANY, OF ILION, NEW YORK, A CORPORATION OF NEW YORK.

GUN-SIGHT.

1,161,281.

Specification of Letters Patent.  Patented Nov. 23, 1915.

Application filed January 20, 1913.  Serial No. 743,059.

*To all whom it may concern:*

Be it known that we, CHARLES H. BARNES, JOHN O. SIMPSON, and WILLIAM H. STEERE, of Ilion, in the county of Herkimer and State of New York, and WILLIAM F. LAWRENCE, of Utica, in the county of Oneida, said State, have invented a certain new and useful Gun-Sight, of which the following is a specification.

Our invention has for its object the production of a rifle sight especially the kind known as peep or rear aperture sights, which is particularly simple in construction, economical in manufacture, and readily adaptable to different guns or rifles; and it consists in the combinations and constructions hereinafter set forth and claimed.

In describing this invention reference is had to the accompanying drawings in which like characters designate corresponding parts in all the views.

Figure 1 is a vertical longitudinal sectional view, partly in elevation, of one form of our invention. Fig. 2 is a rear elevation thereof. Fig. 3 is a vertical cross sectional view on line "A—A", Fig. 1, partly in elevation. Fig. 4 is a view similar to Fig. 1, the extension members being in their extended position, and the upper extension member being turned a quarter turn into its position occupied when the interrupted threads thereof are disengaged from the interrupted threads of the lower extension member. Fig. 5 is a sectional view looking downwardly on line "B—B—", Fig. 1. Fig. 6 is an elevation looking from the right in Fig. 2, illustrating the position of the sight in a fore and aft direction to conform to rifles having different top lines. Fig. 7 is a rear elevation, partly in section, of parts seen in Fig. 2, the extension members being in their lowest positions, and the detent carrier being shown in section. Fig. 8 is a view similar to Fig. 1 of another form of our invention. Fig. 9 is a view similar to Fig. 8, the extension members being shown in their extended position. Fig. 10 is a sectional view of the lower extension member. Figs. 10$^A$ and 10$^B$ are, respectively, a plan and an elevation thereof. Fig. 11 is a face view of the upper extension member shown in Figs. 1 and 2. Fig. 11$^A$ is an edge view thereof. Fig. 12 is an elevation of the sleeve. Fig. 12$^A$ is a plan view thereof. Fig. 12$^B$ is a vertical section taken centrally through the sleeve. Figs. 13, 13$^A$, 13$^B$ are views similar to Figs. 10, 10$^A$, 10$^B$ of a modified form of the extension member shown in Figs. 8 and 9. Fig. 14 is a face view of the upper extension member used in connection with the lower extension member shown in Fig. 13. Fig. 14$^A$ is an end view looking downwardly in Fig. 14. Fig. 14$^B$ is an edge view, looking to the right or left in Fig. 14.

As will be understood by those skilled in the art, rifles have different top lines and the angular relation of the stocks and barrels of some rifles is different from that of other rifles and the contour or top lines of rifles are different.

One of the principal objects of our invention is to provide a peep or rear aperture sight adaptable to any rifle irrespective of the angular relation of the barrel and stock and of the top line thereof.

Other objects will appear throughout the specification.

This gun or rifle sight comprises, generally, a base, a member hinged to the base, and upper and lower extension members, the lower member telescoping into the base and the upper member telescoping into the lower member. The lower member is adjustable by screw threaded means and the upper member is movable bodily from one position to the other.

1 is the base which is here shown as formed with a bracket 2 adapted to be connected to the receiver or stock of the gun and with an arm 3 projecting rearwardly from the bracket 2 and adapted to be normally spaced apart from the underlying portion of the receiver or stock in order that the base is attached at one point only to the gun and hence can be attached to guns having different top lines.

4 is the body member which is hinged to upwardly extending lugs 5 at the rear end of the arm 3 of the base 1, and 6 is a hinge pin connecting the body member and said lugs. The body member is here shown as formed with a passage 7 extending radially relatively to the axis of the pin 6 and as being counterbored from its outer end so that the outer portion of said passage 7 is of greater diameter than the inner end of said passage.

8 is a sleeve member extending into said passage 7 and fitting the portion of less diameter, the sleeve being formed with a lengthwise slot 9, Fig. 12, the sleeve member 8 being also formed with an opening 10 through which the pivot or hinge pin 6 extends.

11, Fig. 10, is the lower extension member sliding within the sleeve 8 and having a lengthwise tongue or spline 12 fixed thereto which extends through the slot 9 of the sleeve 8 and which is formed with threads at its outer edge, the extension member 11 having a notch 13 at its lower end which normally is astride the hinge pin 6.

14 is an adjusting nut encircling the sleeve 8 at the upper end of the body member 4 and having its threads engaging the threads of the spline 12 projecting through the slot 9 of the sleeve 8.

As here shown the nut 14 includes a tubular portion 15 extending into the portion of large diameter of the passage 7 of the body member 4, and a head resting on the upper edge of the body member and interposed between said upper edge and a resilient shoulder provided at the upper end of the sleeve 8. This shoulder, as best seen in Fig. 12, is in the form of a peripheral flange 16, split at intervals to render the same resilient, and bent downward into a slightly conical form, said flange extending into a depression in the upper side of the head of the nut 14, as clearly seen in Figs. 1 and 2. The flange being resilient and yielding, holds the nut from endwise movement, and is one of the features rendering the manufacture of the article economical as a fit can always be made between the sleeves and the nuts irrespective of slight variations in said parts. Preferably the flange 16 and the nut 14 are formed with impositively engaged interlocking or ratcheting means, as a projection 17 struck from the flange 16 and arranged to take into any one of a plurality of depressions 18, Fig. 5, formed in the upper face of the nut.

19 is the upper extension member which includes a stem 20 extending into the passage of the lower extension member 11 and a ring at the upper end of the stem, which ring is formed with the sight opening 21, the upper extension member being adjustable relatively to the lower extension member 11 by a bodily movement rather than by a progressive movement, the progressive adjustment of the sight being effected by the nut 14 and inner extension member 11.

In the form shown in Figs. 1 and 2, the stem 20 and the member 11 are connected by interrupted screw threads which are disengaged by quarter turn of the upper extension member 19 and which when disengaged permit the member 19 to be moved vertically rectilinearly to any desired height.

As seen in Fig. 11, the stem 20 is formed with diametrically opposite substantially flat sides which interrupt the threads and one of these flat sides, as seen in Figs. 1 and 2, is engaged by a spring pressed detent 22 which prevents the member 19 from turning.

The lower extension member 11 is, in the form of our invention shown in Figs. 1, 2, 3 and 10, formed with a lengthwise peripheral groove 23, Fig. 10, which takes the form of a slot at its upper end opening into the interior of said member, and the spring pressed detent 22 is in the form of a flat spring fixed at its lower end in the groove and having its upper end bent in detent form to extend through the upper end of the groove 23 into position to engage the flat face of the stem 20 of the member 19.

One of the flat faces may be provided with indicating characters to show the height of the sight. A circumferential groove 25 is provided at the lower end of said member and the detent 22 enters such groove and prevents unintentional removal of the upper extension member 19, as it requires a comparatively great effort to remove the member 19 against the spring action of the detent 22.

As seen in Figs. 8 and 9, the member 19 instead of being connected to the lower extension member 11 by interrupted screw threads may be held in position by an expansible and contractile clamping piece 26 as a sleeve, Fig. 8, threading into the upper end of the passage of the lower extension member 11, this sleeve being split longitudinally to form prongs which render the sleeve expansible and contractile. The prongs terminate in conical portions 27 which engage an internal conical cam formed on the inner walls of the lower extension member 11 at the base of the threads thereof, Figs. 8 and 9.

The sleeve 26 is provided with a head at its upper end overlapping the upper end of the extension member 11, and the stem of the member 19 is formed at intervals with peripheral grooves 28 in which bite the inclined ends of the prongs 27 of the nut 26, Fig. 14.

The member 19, in Figs. 8 and 9, is held from turning and from removal by a shoulder as a threaded plug 29 threading in the transverse passage in the lower extension member 11 and having its inner end projecting into a lengthwise groove 30 in the stem of the member 19, Figs. 8, 9 and 14.

The body member 4 is tiltable about the axis of the hinge pin 6 in order that the sight opening may be adjusted to the aiming lines of different guns, and as the sights are swung from a position extending alongside the contiguous portion of the gun or stock thereof, into an upright position, means is provided for determining exactly the proper upright position or angle relative to the base. This means consists of a spring pressed detent extending through one of the lugs 5 into a V-shaped notch or a notch 31 shaped to ratchet the detent, the notch being formed in one side face of the body member 4.

As this sight is adapted to be mounted on guns having different top lines, the proper upright position of the body member 4 will not be the same relatively to the base in all guns, and in order to provide for the adjustment of the body member 4 for all guns, means is provided for shifting the detent relatively to the base. In order to effect this shifting, the detent is carried by the movable carrier and in this form of our invention, the carrier is in the form of a disk 32 mounted on the hinge pin 6 between one of the lugs 5 and the head 33 of the hinge pin, and the detent is in the form of a spring pressed plunger 34 carried by the disk in a socket formed therein, and projecting through an arc-shaped slot 35, Fig. 6, concentric with the hinge pin 6.

The detent carrier is held in its adjusted position by the head 33 of the hinge pin 6, as the hinge pin threads into one of the lugs 5, and hence turning of the hinge pin in the proper direction clamps the head 33 onto the detent carrier and holds the detent carrier in its adjusted position. The character of the adjustment effected by the detent carrier is clearly seen in Fig. 6.

In the operation, the base 1 is secured to the rifle by screws or in any suitable manner, and the angular adjustment of the members 4, 11 and 19 relatively to the base in order that the axis of the aperture 21 will be exactly parallel with the point blank aiming alinement of the gun, is effected by loosening the screw 6, turning the detent carrier 32 so that the detent 34 will enter the notch 31 of the body 4, when the body reaches the proper point in its pivotal movement and the screw 6 is again tightened. The upper extension member 19 is raised relatively to the lower which is in its lowest position, until the aperture 21 is approximately alined with the point blank aiming alinement, and the member 19 may, if desired, be left permanently in this elevated position. Any fine adjustment, as elevating the sight opening 20 to predetermined height to adapt the rifle to different ranges, is effected by manipulating the nut 14.

What we claim is:

1. A gun sight comprising a base, a body hinged to the base, upper and lower extension members, the upper member telescoping within the lower and the latter telescoping into the body, and means for shifting the extension members and for holding the same in shifted positions, said means including a member having movement about its axis and being non-movable in an axial direction, substantially as and for the purpose described.

2. A gun sight comprising a base, a body hinged to the base and formed with a passage, a sleeve extending into the passage, an extension member movable in the sleeve and having a threaded portion extending to the outside of the sleeve, and a nut encircling the sleeve and having threads coacting with said threaded portion of the extension member, the sleeve and nut having engaging portions operating to normally hold the nut from turning, substantially as and for the purpose specified.

3. A gun sight comprising a base, a body hinged to the base and formed with a passage, a sleeve extending into the passage, an extension member movable in the sleeve and having a threaded portion extending to the outside of the sleeve, and a nut encircling the sleeve and having threads coacting with said threaded portion, the sleeve being formed with a resilient peripheral flange arranged to engage the nut, substantially as and for the purpose set forth.

4. A gun sight comprising a base, a body hinged to the base and formed with a passage, a sleeve extending into the passage, an extension member movable in the sleeve and having a threaded portion extending to the outside of the sleeve, and a nut encircling the sleeve and having threads coacting with said threaded portion, the sleeve being formed with a resilient peripheral flange at its upper end arranged to engage the nut, the flange and the nut being formed respectively with a depression and a projection for entering the depression, substantially as and for the purpose described.

5. A gun sight comprising a base, a body hinged to the base, a sleeve within the body and formed with a lengthwise slot, an extension member located within the sleeve and having a tongue extending through the slot thereof and formed with threads outside of the sleeve, an adjusting nut encircling the sleeve and having its threads engaging the threads of said tongue, the sleeve and nut having impositively engaged locking means whereby the nut is held in its adjusted position, substantially as and for the purpose specified.

6. A gun sight comprising a base, a body hinged to the base, a sleeve within the body and formed with a lengthwise slot, and having a peripheral shoulder located outside of the body, an extension member located within the sleeve and having a tongue extending through the slot thereof and formed with threads, an adjusting nut turning on the sleeve and having its thread arranged to engage the threads of the tongue, the shoulder and nut having impositively engaged locking means whereby the nut is held in its adjusted position, substantially as and for the purpose set forth.

7. A gun sight comprising a base, a body hinged to the base and formed with a passage having portions of different diameters, the portion of greater diameter being located at the outer end of the passage, a sleeve extending into the passage and fitting the portion of less diameter, the sleeve being formed with a lengthwise slot, the extension member having a tongue extending through the slot and formed with threads, and a nut turning on the sleeve and having a portion extending into the portion of greater diameter, the nut coacting with said threads, substantially as and for the purpose described.

8. A gun sight comprising a base, a body hinged to the base and formed with a passage, a sleeve extending into the passage and projecting beyond the outer end of the same, and having a peripheral shoulder located outside of the passage, the sleeve being formed with a lengthwise slot, an extension member slidable in the sleeve and having a tongue extending through the slot and provided with threads outside of the sleeve, and a nut encircling the sleeve and having its thread arranged to engage the first-mentioned threads, the nut being interposed between the outer end of the body member and said shoulder of the sleeve, substantially as and for the purpose specified.

9. A gun sight comprising a base, a body member hinged to the base and formed with a passage, a sleeve extending into the passage and projecting beyond the outer end of the same, and having a peripheral resilient shoulder located outside of the passage, the sleeve being formed with a lengthwise slot, an extension member slidable in the sleeve and having a tongue extending through the slot and provided with threads outside of the sleeve, the nut encircling the sleeve and having its thread arranged to engage the first-mentioned threads, the nut being interposed between the outer end of the body member and said shoulder of the sleeve, and being engaged by said shoulder which serves as a detent to hold the nut in any adjusted position, substantially as and for the purpose set forth.

10. A gun sight comprising a base, a body hinged to the base and formed with a passage having portions of different diameters, the portion of greater diameter being located at the outer end of the passage, a sleeve extending into the passage and fitting the portion of less diameter and projecting beyond the outer end of the body, the sleeve being formed with a lengthwise slot and also with a peripheral resilient flange at its outer end, an extension member movable in the sleeve and having a tongue extending through the slot and provided with threads located outside of the sleeve, and a nut encircling the sleeve and having its thread arranged to engage the threads of said tongue, the nut including a tubular portion extending into the portion of the passage of greater diameter of the body member and a head interposed between the flange of the sleeve and the outer end of the body, substantially as and for the purpose described.

11. A gun sight comprising a base, a member connected to the base and comprising a sleeve, extension members, one provided with an eye-piece and telescoping within the other, and the latter being non-rotatable and telescopically mounted in the sleeve, and means associated with said member connected to the base for shifting the last-named extension member in a lengthwise direction, substantially as and for the purpose specified.

12. A gun sight comprising a base, a sleeve connected to the base, and an extension member extending into the sleeve and adjustable by a partial rotary and a lengthwise movement, substantially as and for the purpose set forth.

13. A gun sight comprising a base, a member carried by the base and formed with a passage and an extension member having a stem extending into the passage, said members being provided with complemental threads and interposed spaces, whereby in one position of the members the extension member may be freely slid in a rectilinear direction, and in another position of the members at an angle to the first, the extension member will be held against movement in a rectilinear direction, substantially as and for the purpose described.

14. A gun sight comprising a base, a member carried by the base and formed with a passage, an extension member having a stem extending into the passage, said members being connected by interrupted threads, and the extension member being formed with a lengthwise flat face interrupting the threads thereof, and spring means coacting with said flat face for normally preventing turning of the extension member, substantially as and for the purpose specified.

15. A gun sight comprising a base, a supporting member connected to the base, extension members, the upper member telescoping within the lower, and the latter telescoping within the supporting member, a nut for effecting the telescoping action of the lower extension member relatively to the supporting member, and the upper extension member being movable bodily rectilinearly relatively to the lower extension member, and means for holding the upper extension member at any elevation relatively to the lower extension member, substantially as and for the purpose set forth.

16. A gun sight comprising a base, a supporting member connected to the base, extension members, the upper extension member telescoping within the lower, and the latter telescoping within the supporting member, a nut for effecting the telescoping action of the lower extension member relatively to the supporting member, and the extension members being connected by interrupted screw threads, and the upper extension member having a flat face between the interrupted threads thereof and a spring pressed detent carried by the lower extension member and arranged to coact with said flat face when the interrupted threads of the extension members are engaged and thereby hold the upper extension member from turning, substantially as and for the purpose described.

17. A gun sight comprising a base, a sleeve connected to the base and having a lengthwise peripheral groove, an extension member extending into the sleeve and adjustable by a partial rotary and lengthwise movement, and a spring extending in said lengthwise groove and fixed at one end and having its other end arranged to engage the extension member and prevent movement thereof, substantially as and for the purpose specified.

18. A gun sight comprising a base, a body member hinged to the base and formed with a passage, a sleeve extending into said passage and formed with a shoulder at its upper end and being also formed with a lengthwise slot, an extension member movable in the sleeve and having a tongue projecting through said slot and formed with threads, and being also formed with a lengthwise peripheral groove, a nut encircling the sleeve and having its threads engaging the threads of said tongue, the nut being interposed between the upper end of the body member and said shoulder, a second extension member extending into the first and adjustable vertically therein, and a spring extending into the groove of the first-mentioned member and being fixed at one end therein and having its other end arranged to engage the second extension member, substantially as and for the purpose set forth.

19. A gun sight comprising a base, a member connected to the base and an extension member extending into the former member and adjustable bodily relatively thereto, and being formed with a peripheral depression, and a spring pressed detent carried by the former member and arranged to engage the depression, substantially as and for the purpose described.

20. A gun sight comprising a base, a member connected to the base and formed with a passage, an extension member telescoping within said passage and movable bodily relatively to the former member, the walls of the upper end of said passage being threaded and having a conical cam at the inner end of the screw threads, and an externally threaded part turning in the screw threads of the passage and having an expansible and contractile conical part for engaging the extension member and said cam and being forced thereby into engagement with the extension member, substantially as and for the purpose specified.

21. A gun sight comprising a base, a supporting member connected to the base and formed with a passage, an extension member telescoping within said passage and movable bodily relatively to the former member, the extension member being formed with a peripheral depression, and means carried by the supporting member for entering said depression and holding the extension member in elevated position, substantially as and for the purpose set forth.

22. A gun sight comprising a base, a member connected to the base and formed with a passage, an extension member telescoping within said passage and movable bodily relatively to the former member and having a peripheral depression, the walls of the upper end of said passage being threaded, and having a conical cam at the inner end of the threads, a bushing threading in said passage and having a spring prong at its advance end for engaging the cam and be pressed thereby into said depression, substantially as and for the purpose described.

23. A gun sight comprising a base, a body hinged to the base, a hinge pin connecting the body and the base, a detent carrier mounted on the hinge pin and adjustable about the same, and a spring pressed detent carried by said carrier and coacting with the body, substantially as and for the purpose specified.

24. A gun sight comprising a base formed with an upwardly extending lug having an opening, a body hinged to said lug, a hinge pin connecting the lug and the body, a detent carrier mounted on the hinge pin contiguous to the lug, and a detent carried by said carrier and projecting through the opening in the lug into engagement with the body, substantially as and for the purpose set forth.

25. A gun sight comprising a base formed with a pair of upwardly extending lugs, a body extending between the lugs, a hinge pin extending transversely through the lugs and the body and threading into one of the lugs at one end and having a head at its other end, the other lug being formed with a slot concentric with the hinge pin, a detent carrier mounted on the pin between the head thereof and the lug formed with the slot, and a spring pressed detent carried by said carrier and projecting through the slot into engagement with the body, substantially as and for the purpose described.

26. A gun sight comprising a base formed with a pair of upwardly extending lugs, a body extending between the lugs, a hinge pin extending transversely through the lugs and the body and threading into one of the lugs at one end and having a head at its other end, the other lug being formed with a passage concentric with the hinge pin, a detent carrier mounted on the pin between the head thereof and the lug formed with the passage, and a spring pressed detent carried by said carrier and projecting through the slot into engagement with the body member, said carrier being in the form of a disk eccentrically mounted on the hinge pin, substantially as and for the purpose specified.

27. A gun sight comprising a base, two extension members, one of said members being freely movable in a lengthwise direction in relation to the other in one angular position of the two, and coöperating means on the members for holding the same against relative lengthwise movement in another angular position of said members, substantially as and for the purpose set forth.

In testimony whereof, we have hereunto signed our names in the presence of two attesting witnesses, at Ilion, in the county of Herkimer, in the State of New York, this 23rd day of December, 1912.

CHARLES H. BARNES.
JOHN O. SIMPSON.
WILLIAM H. STEERE.
WM. F. LAWRENCE.

Witnesses:
T. A. HAUGHTON,
JOHNSON MORGAN.

Copies of this patent may be obtained for five cents each, by addressing the "Commissioner of Patents, Washington, D. C."